United States Patent [19]

Tsutsui

[11] Patent Number: 5,189,290
[45] Date of Patent: Feb. 23, 1993

[54] OPTICAL CARD PROCESSING APPARATUS USING TRACKING ERROR SIGNALS TO DETERMINE PROPER CARD ORIENTATION

[75] Inventor: Keiichi Tsutsui, Yokohama, Japan

[73] Assignee: Omron Corporation, Kyoto, Japan

[21] Appl. No.: 863,547

[22] Filed: Apr. 6, 1992

Related U.S. Application Data

[63] Continuation of Ser. No. 595,578, Oct. 11, 1990, abandoned.

[30] Foreign Application Priority Data

Oct. 14, 1989 [JP]  Japan .................................. 1-267042

[51] Int. Cl.$^5$ .......................... G11B 7/00; G06K 7/10
[52] U.S. Cl. ..................................... 235/454; 250/569; 369/58
[58] Field of Search ............... 235/436, 454, 456, 475; 250/201.5, 569; 369/53, 58

[56] References Cited

U.S. PATENT DOCUMENTS

| | | | |
|---|---|---|---|
| 4,700,056 | 10/1987 | Silvy et al. | 250/201 |
| 4,745,588 | 5/1988 | Yoshikawa et al. | 369/44.28 |
| 4,751,394 | 6/1988 | Matsuoka et al. | 250/561 |
| 4,924,483 | 5/1990 | Cho | 377/45 |
| 4,925,717 | 5/1990 | Tsukamura et al. | 369/288 |
| 4,931,628 | 6/1990 | Wada | 235/454 |
| 4,935,912 | 6/1990 | Hirano et al. | 369/54 |
| 4,955,010 | 9/1990 | Nabeshima et al. | 369/43 |
| 4,965,816 | 10/1990 | Shih et al. | 341/11 |
| 4,982,075 | 1/1991 | Aoki et al. | 235/456 |
| 4,982,391 | 1/1991 | Sakagami et al. | 235/454 |
| 5,053,898 | 10/1991 | Hashimoto et al. | 369/58 X |
| 5,119,356 | 6/1992 | Matsuoka et al. | 235/454 X |

FOREIGN PATENT DOCUMENTS

| | | |
|---|---|---|
| 0111010 | 6/1984 | European Pat. Off. . |
| 0300481 | 1/1989 | European Pat. Off. . |
| 58-114354 | 7/1983 | Japan . |
| 59-38931 | 3/1984 | Japan . |
| 61-68735 | 4/1986 | Japan . |

Primary Examiner—John W. Shepperd
Assistant Examiner—Edward H. Sikorski
Attorney, Agent, or Firm—Dickstein, Shapiro & Morin

[57] ABSTRACT

An optical card processing apparatus is disclosed in which an optical head producing an irradiating light beam is forcibly moved in a direction orthogonal to a direction of tracks of an optical card set in the apparatus. A tracking error signal as the moving light beam irradiates the card is analyzed to determine if the optical card is properly set in the apparatus.

12 Claims, 5 Drawing Sheets

OPTICAL CARD PROCESSING APPARATUS USING TRACKING ERROR SIGNALS TO DETERMINE PROPER CARD ORIENTATION

This application is a continuation of application Ser. No. 07/595,578, filed Oct. 11, 1990, now abandoned.

BACKGROUND OF THE INVENTION

1. Field of the Invention

The present invention relates to an optical card processing apparatus for handling a card-shaped information recording medium on which information can be optically recorded (to be referred to as an optical card herebelow) so as to record information thereon and/or to reproduce (read) information written thereon, and in particular, to an optical card processing apparatus having a function to judge a setting state or a disposition State Of an optical card therein for a determination of a normal state or an abnormal state.

2. Description of Related Art

Figure 4:
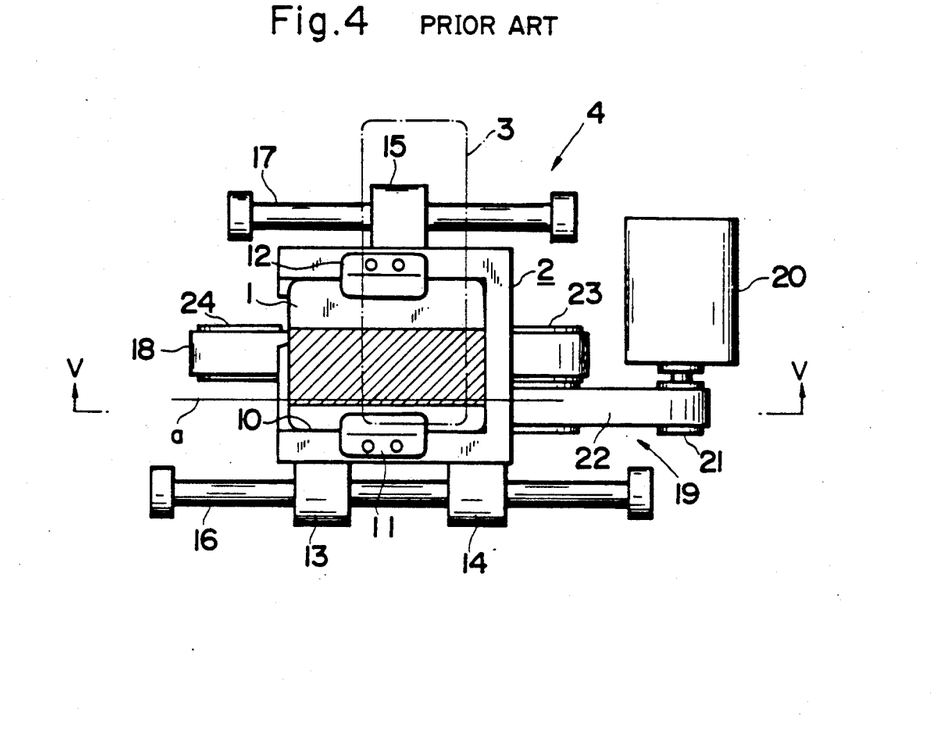
FIG. 4 is a plan view showing a mechanism of a conventional optical card processing apparatus.
Figure 5:
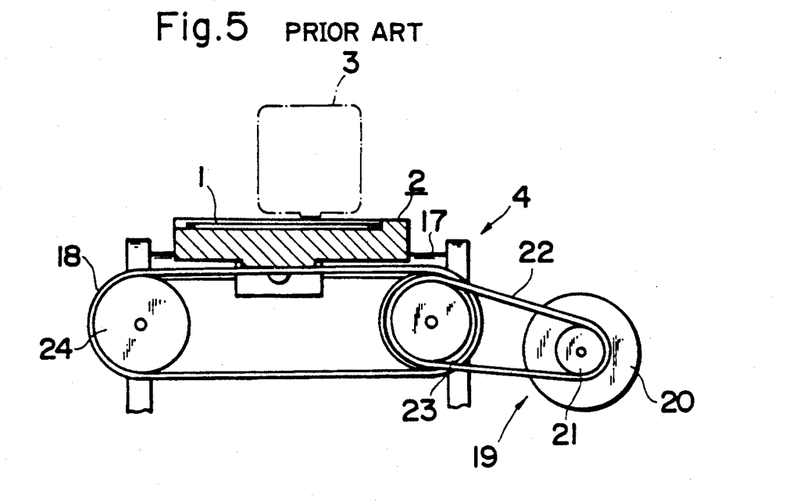
FIG. 5 is a cross-sectional view of FIG. 4 along a line V—V.

The conventional optical card processing apparatus of this kind comprises, as shown in FIGS. 4 and 5, a shuttle 2 for supporting an optical card 1 inserted thereonto from a card insertion slit (not shown), an optical head 3 for irradiating a converged light onto the optical card 1 to record information thereon and/or to reproduce information recorded thereon (the intensity of the irradiated light varies between the recording and reproducing operations), and a carrier or transporting mechanism 4 for reciprocating the shuttle 2. In this regard, although not shown, there is also included a mechanism for moving the optical head 3 in a direction orthogonal to the direction of the reciprocating movement of the shuttle 2.

Figure 6A:
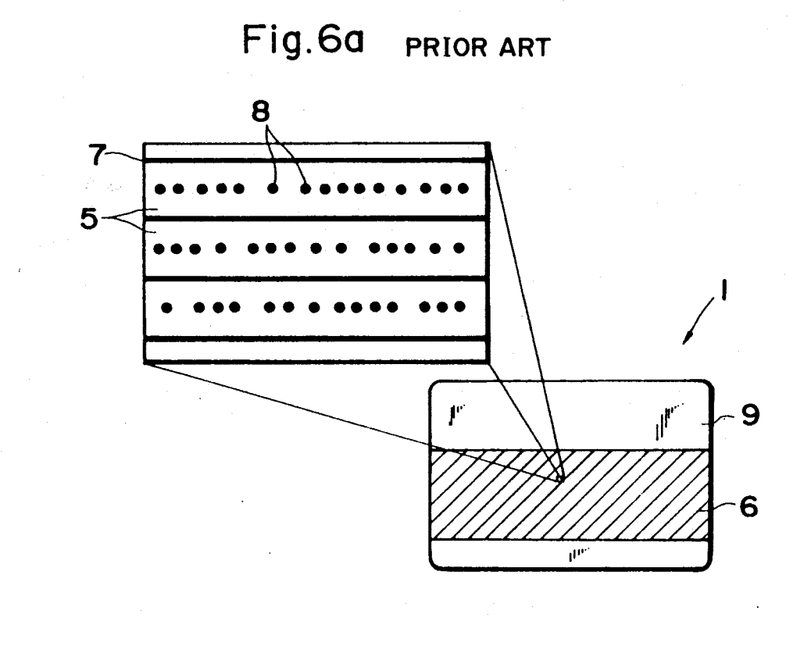
FIGS. 6a and 6b are schematic diagrams respectively showing front and rear surfaces of an optical card.

The optical card 1 includes, as shown in a partially magnified diagram of FIG. 6a, an information recording section 6 (a hatched portion) having a surface on which a lot of information recording tracks 5 are disposed. The optical head 3 irradiates the converged light onto these information recording tracks 5 for the information recording and reproducing operations. In this configuration, a reference numeral 7 indicates a track guide to be used by the optical head 3 for tracing the information recording tracks 5 and a numeral 8 denotes pits constituting a unit of information written on the tracks 5. The track guide 7 and the pits 8 are associated with a light reflection factor relatively lower than one developed in portions of the card after than the track guide 7 and pits.

Figure 6B:
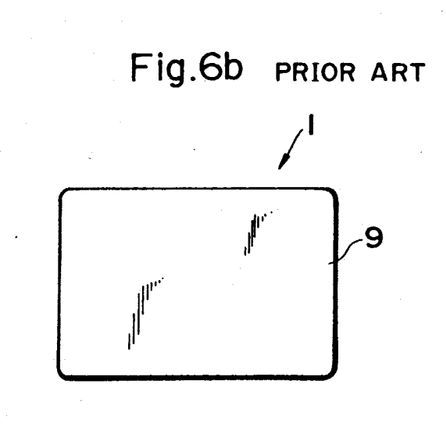

FIG. 6b shows a rear surface of the optical card 1. In the rear and front surfaces of the card 1, blank regions 9 may be adopted by the user to present a logotype or logo mark in conformity with the user's specification.

The shuttle 2 includes a depression 10 disposed on an upper surface thereof and clamp mechanisms 11 and 12. The optical card 1 is arranged in the shuttle 2 along a direction in which the card is fed so as to be fixed by means of the clamp mechanisms 11 and 12.

The transporting mechanism 4 includes guide shafts 16 and 17 for guiding and for supporting the shuttle 2 via bearings 13 to 15 disposed on the shuttle 2 to allow a reciprocating movement of the shuttle 2 and a driver unit 19 for reciprocating the shuttle 2 by means of a transporting belt 18. The driver unit 19 transfers power from a motor 20 via a pulley 21 on a driving side and a power transfer belt 22 to a driving pulley 23. The transporting belt 18 is reeved between the driving pulley 23 and a pulley 24 subordinate thereto so as to be linked with the shuttle 2. When the belt 18 starts running, the shuttle 2 is set to a reciprocating movement.

With the above-described arrangement, when the optical card 1 is inserted from the card inlet, the card 1 is taken into the depressed portion 10 on the shuttle 2 to be kept therein. Next, the motor 20 drives the transporting belt 18 in a running state to move the shuttle 2. After the card 1 is aligned at a predetermined position, the optical head 3 is activated to emit a converged light onto the information recording section 6 of the optical card 1 for an information recording or reproducing operation.

The information recording and reproducing operations on the optical card 1 are accomplished on assumption that the card 1 is appropriately set onto the shuttle 2. Particularly, it is necessary that the optical card 1 is arranged correctly with respect to the front or rear side and to a forward or reverse direction of the card 1.

Conventionally, when confirming the presence or absence of the optical card 1 in the shuttle 2, there has been disposed a special device such as a micro switch in the processing apparatus, which however leads to a problem that the number of parts becomes greater and hence the cost as well as the size of the apparatus is increased.

To cope with the problem above, there has been described a method in the Japanese Patent Application Laid-Open No. 61-280073. In this method, based on the difference between the light reflection factors respectively of the information recording section 6 and the blank area 9 of the optical card 1, the intensity of the reproduced signal level is detected for each of the recording section 6 and the blank area 9, thereby judging to determine the setting state of the optical card 1 in the apparatus.

However, depending on materials and colors of the information recording section 6 and the blank region 9 of the optical card 1, the difference between the light reflection factors respectively of the recording section 6 and the blank region 9 becomes quite small. In this situation, there rarely appears the difference between the magnitudes of the reproduced signals associated with the section 6 and the region 9. For example, the blank region 9 having white as its base color develops a reflection factor of at least 30%. On the other hand, there is obtained a reflection factor of about 40%±5% on the information recording section 6 having a recording layer which is produced by diffusing particles of silver in a surface of the information recording section 6 through an exposure and thermal treatment by use of a halogenated silver emulsion containing fine particles of silver. Consequently, there appears substantially an equal reflection factors in the blank region 9 and the information recording section 6. If the surface of the optical card 1 is dirty, for example, foreign matter is affixed to the card, the setting or installing state of the optical card 1 cannot be easily determined by use of the magnitudes of the respective reproduced signal levels.

SUMMARY OF THE INVENTION

It is therefore an object of the present invention to provide a novel optical card processing apparatus in which the setting state of an optical card can be easily judged with a high accuracy even when the difference between the reflection factors respectively of the blank area and the information recording section thereof is quite small, thereby removing the difficulty above.

In accordance with the present invention, an optical card processing apparatus is provided in which a light converged by use of an objective is irradiated onto an optical card installed in a predetermined position for recording information onto the card or for reproducing information recorded thereon includes lens transport means for forcibly moving the objective, in a state where a focusing servo is operating, in a direction orthogonal to a direction of information recording tracks of the optical card and judge means for detecting, in the forcible movement of the objective, presence or absence of a tracking error signal to judge the setting state of the optical card.

When the optical card is appropriately set to the apparatus, the converged light is irradiated onto the information recording section. Consequently, when the objective is forcibly moved in a direction orthogonal to the information recording tracks, the converged light traverses the information recording tracks, thereby detecting a tracking error signal.

As contrast therewith, when the optical card is set to the apparatus in an inappropriate manner with respect to the front/rear side thereof or to the forward/reverse direction thereof, namely, when the card is set with a wrong side facing upward, for example, the converged light is not irradiated onto the information recording section. As a result, even if the objective is forcibly moved in a direction orthogonal to the direction of the information recording tracks, the converged light thus emitted does not intersect the information recording tracks and hence the system cannot detect any tracking error signals. In consequence, even for an optical card in which the reflection factors respectively of the blank region and the information recording section thereof are rarely different from each other, the setting state of the optical card can be easily determined with a high reliability.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
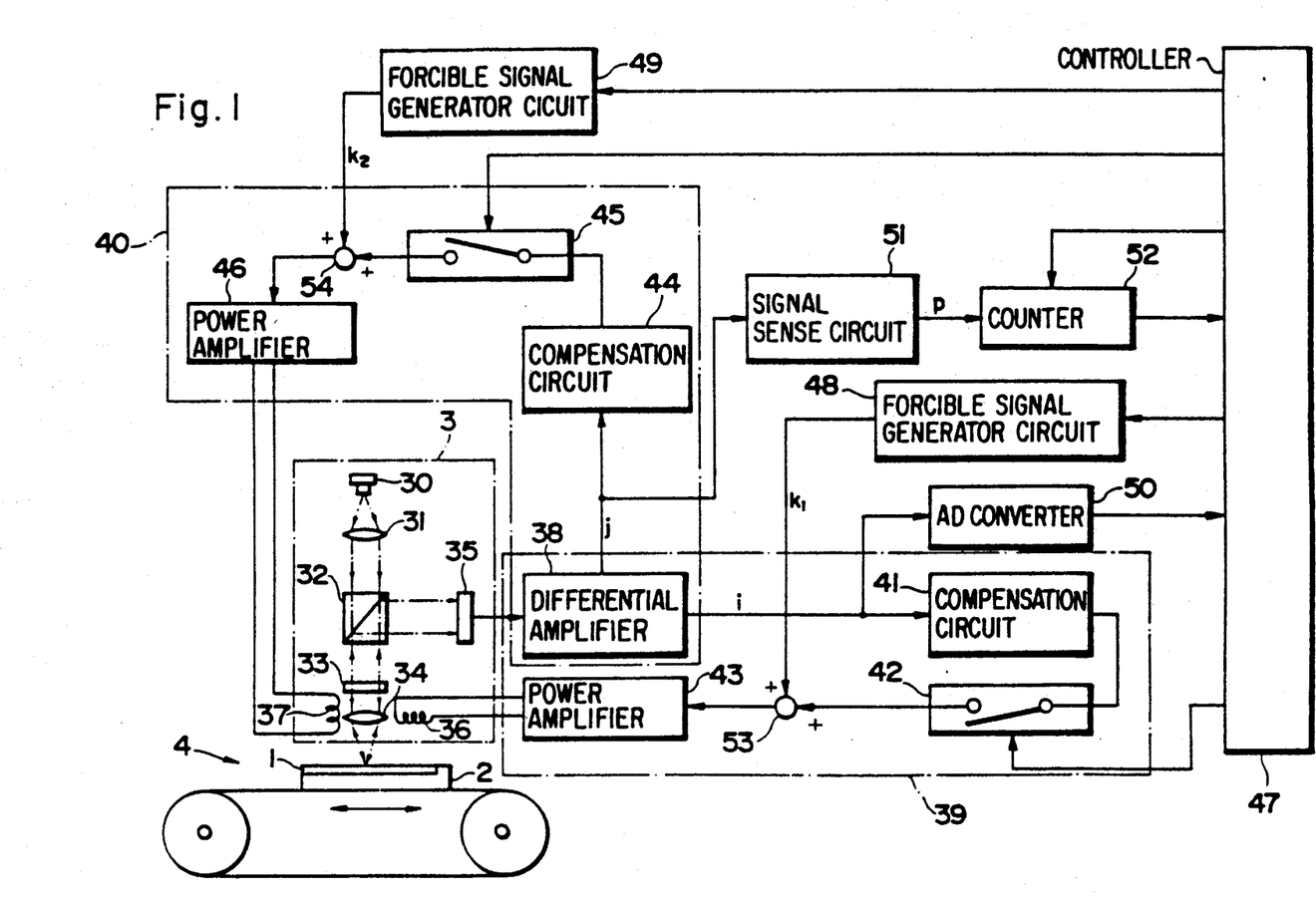
FIG. 1 is a block diagram schematically showing an electric configuration of an optical card processing apparatus in an embodiment in accordance with the present invention.

FIG. 1 shows an overall structure of an optical card processing apparatus in an embodiment according to the present invention. It includes an optical card 1, a shuttle 2 for keeping the optical card 1, an optical head 3 disposed at a position over the shuttle 2, and a transporting mechanism 4 arranged at a position below the shuttle 2. Moreover, the mechanism shown in FIGS. 4 and 5 can be directly applied also to this card processing apparatus.

The optical head 3 comprises a light source 30 including a laser diode, which emits a light beam to be collimated through a collimation lens 31 such that the resultant light is passed through a polarization beam splitter 32 so as to attain a p-polarized light. The light is fed through a quarter-wave plate 33 to be focused via an objective 34 onto the optical card 1. The light reflected from the optical card 1 returns through the light path in a reverse direction to pass the objective 34 and the quarter-wave plate 33. The p-polarized light is thus converted into an s-polarized light, which is hence reflected on the polarization beam splitter 32 so as to be received by a light receiver 35.

The objective 34 is arranged in such a manner that when a focusing coil 36 and a tracking coil 37 are powered, the objective 34 is respectively displaced to be orthogonal and parallel to a surface of the optical card 1. That is, the focusing coil 36 sets the objective 34 to a focusing direction orthogonal to the card surface, whereas the tracking coil 37 moves the objective 34 to a posture parallel to the card surface, namely, orthogonal to the information recording tracks 5 of the information recording section 6.

The light receiver 35 includes a pair of photodiodes (not shown), which are arranged at positions forming a symmetric pattern to be adjacent to each other. The reflection light from the optical card 1 is focused onto a location in the proximity of a boundary between the photodiodes. The photodiodes feed respective outputs to associated inputs of a differential amplifier 38, which obtains a difference between the two outputs so as to deliver a focusing error signal i and a tracking error signal j to a focusing servo loop 39 and a tracking servo loop 40, respectively.

The focusing servo loop 39 is a control loop for achieving a focusing servo operation in which the signal path is established through the differential amplifier 38, a compensation circuit 41, a switching circuit 42, an adder 53, a power amplifier 43, and the focusing coil 36. The compensation circuit 41 determines, based on the focusing error signal i, a correction voltage (or current) associated with the upward/downward movement of the objective 34. Thereafter, the power amplifier 43 amplifies the power to be supplied to the focusing coil 36.

The tracking servo loop 40 is a control loop for accomplishing a tracking servo operation and includes a signal route constituted with the differential amplifier 38, a compensation circuit 44, a switching circuit 45, an adder 54, a power amplifier 46, and the tracking coil 37. The compensation circuit 44 decides, depending on the tracking error signal j, a correction voltage (or current) related to the parallel movement of the objective 34 such that the power amplifier 46 then amplifies the power to be supplied to the tracking coil 37.

The power amplifiers 43 and 46 are respectively connected via the adders 53 and 54 to forcible signal generator circuits 48 and 49, which operate under supervision of the controller 47.

The forcible signal generator 48 delivers a forced movement signal $k_1$ to the focusing coil 36 to forcibly move the objective 34 toward the focusing direction. The forcible signal generator 49 on the other hand supplies a forced movement signal $k_2$ to the tracking coil 37 to forcibly move the objective 34 in a direction orthogonal to the information recording tracks 5.

Figure 2:
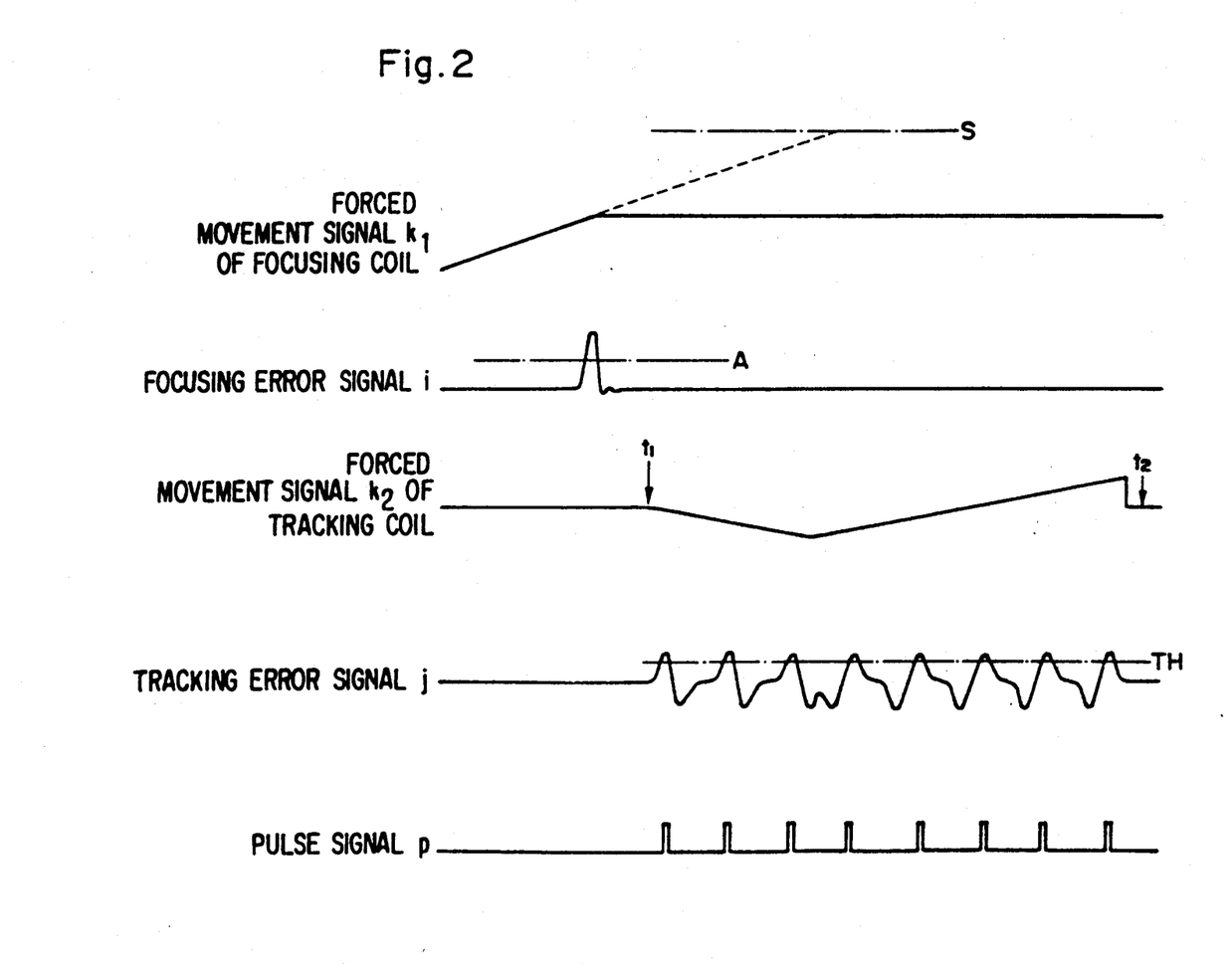
FIG. 2 is a signal timing chart showing the operation of the circuit of the card processing apparatus of FIG. 1.

FIG. 2 shows operation timings of the forced movement signal $k_1$ to be fed to the focusing coil 36 and the focusing error signal i to be delivered thereto during the forced movement.

In the configuration of FIG. 1, a circuit including an analog-to-digital (A/D) converter 50 is disposed to sense the focusing error signal i during the forced movement. The A/D converter 50 converts the focusing error signal i into a digital signal. Resultantly, the controller 47 judges to determine an occurrence of the focusing error signal i and a condition where the signal level of the digital signal exceeds a discrimination level A shown in FIG. 2).

FIG. 2 further shows the forced movement signal $k_2$ to be fed to the tracking coil 37 and the tracking error signal j to be developed in the forced movement.

In the structure of FIG. 1, a circuit including the signal sense circuit 51 and a counter 52 is disposed to determine whether or not the tracking error signal j has been produced in the forced movement. The signal sense circuit 51 discriminates the value of the tracking error signal j with use of a threshold value TH for a binarization of the signal, thereby producing a pulse signal p. The number of pulse signals p is counted during a period of time from a point of time $t_1$ when the forced movement signal $k_2$ is generated to a point of time $t_2$ when the signal $k_2$ is stopped. The controller 47 compares the obtained count value with a reference value to determine the presence or absence of the tracking error signal j to determine whether the optical card is oriented correctly with respect to the front or rear side and with respect to a forward or reverse direction.

Figure 3:
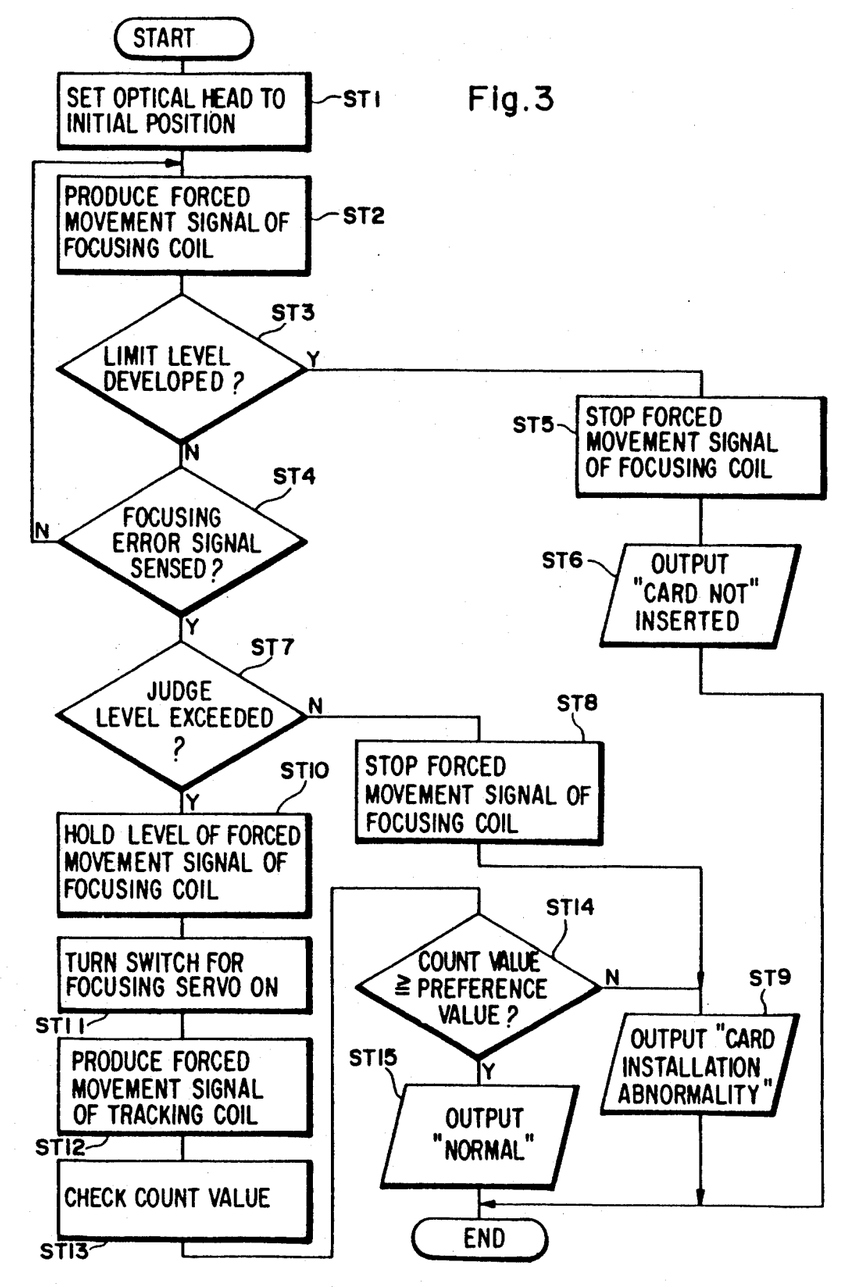
FIG. 3 is a flowchart illustratively showing a control procedure of a controller of FIG. 1.

FIG. 3 shows a control procedure employed by the controller 47 to judge the setting or installation state of the optical card 1 on the shuttle 2.

When the optical card 1 is inserted through the card inlet to be retained on the shuttle 2, a step 1 (to be denoted as ST1 in the flowchart of FIG. 3) moves the optical head 3 by means of the head transporting mechanism to an initial position thereof.

In general, the information recording section 6 is disposed in a portion of the front surface of the optical card 1, the portion being shifted from the center portion toward a side thereof as shown in FIG. 6a. Let us assume here that an end position of the side associated with the information recording section 6 is selected as the initial position a as shown in FIG. 4. With this provision, if the optical card 1 is inserted in a wrong orientation with respect to the predetermined insertion direction thereof, namely, if the tail end of the card 1 is first inserted in the inlet slit, the optical head 3 is positioned over the blank region 9 of the card 1. This enables the apparatus to judge the associated card installation state, which will be described later in detail.

In a step 2, the controller 47 initiates the forcible signal generator 48 to produce a forced movement signal $k_1$ so as to energize the focusing coil 36, thereby forcibly moving the objective 34 to the focusing direction. A focusing error signal i created in the forced movement is converted through the A/D converter 50 into a digital signal to be fed to the controller 47. In this operation, the switching circuit 42 is kept retained in the off state.

A step 3 determines whether or not the magnitude of the forced movement signal $k_1$ reaches a predetermined limit level S. A step 4 then judges to decide whether or not a focusing error signal i has been sensed.

In a case where the focusing error signal i is not sensed even when the objective 34 is moved in the overall movable range thereof with the forced movement signal $k_1$ increased to the limit level S, the system assumes that the optical card 1 is missing in the shuttle 2. Control is then passed from the step 3 to a step 5, which then turns the forced movement signal $k_1$ off and outputs a message "Card not inserted" (step 6).

If the focusing error signal i is sensed in the forced movement, the judgement of the step 4 results in "Yes" to pass control to a step 7. In this step 7, the controller 47 determines whether or not the signal level of the focusing error signal i has reached the judge level A.

If the signal level does not exceed the judge level A, the check of the step 7 results in "No". Consequently the apparatus assumes that the converged light is irradiated onto the bank region 9 having a reflection factor less than a reflection factor of the information recording section 6, namely, the optical card 1 is installed on the shuttle 2 upside down or with a wrong orientation with respect to the insertion direction thereof. As a result, the system turns the forced movement signal $k_1$ off and then outputs a message "Card installation abnormality" (steps 8 and 9).

If the step 7 judges that the signal level has exceeded the judge level A, the controller 47 issues a focusing servo instruction to hold the current signal level of the forced movement signal $k_1$ and then turns the switching circuit 42 associated with the focusing servo loop 39 on. Steps 10 and 11 are the operation procedure in which the focusing servo is started.

Subsequently, while the focusing servo is in the operating state, the controller 47 causes the forcible signal generating circuit 49 to produce the forced movement signal $k_2$ for a predetermined period of time. The tracking coil 37 is hence powered to forcibly move the objective 34 in a direction orthogonal to the information recording tracks 5 of the optical card 1 (setp 12). A tracking error signal j generated in the forced movement is compared with a threshold value TH in the signal sense circuit 51 for a binarization thereof. The resultant pulse signal p is counted by the counter 52 during a period of time from the point of time $t_1$ when the forced movement signal $k_2$ is generated to the point of time $t_2$ when the signal $k_2$ is stopped (step 13). In this operation, the switch 45 is kept in the off state. The counted value is received by the controller 47, which in turn compares the count value with a reference value. If the count value is equal to or more than the reference value, an occurrence of the tracking error signal j is assumed and hence a message "Normal" is produced (step 15). If the count value is less than the reference value, it is assumed that the optical card 1 has been installed on the shuttle 2 upside down or with an inappropriate orientation in the insertion direction thereof. Consequently, the forced movement signal $k_2$ is stopped and a message "Card installation abnormality" is outputted (step 9).

In the case where the optical card 1 is installed on the shuttle 2 in an appropriate fashion, the controller 47 turns the switching circuit 45 of the tracking servo loop 40 on to activate the tracking servo into the operating state. Thereafter, control is passed to an operation to record information on the optical card 1 or to reproduce information recorded on the optical card 1 in advance.

While particular embodiments of the invention have been shown and described, it will be obvious to those skilled in the art that various changes and modifications may be made without departing from the present invention in its broader aspects.

What is claimed is:

1. An optical card processing apparatus for determining whether an optical card is disposed in a proper reading/writing orientation in said apparatus, said apparatus comprising:

means for holding an optical card provided with an information recording section on a surface thereof, said information recording section being provided with information recording tracks;

an optical system including a light emitting element, an objective for focusing light emitted from said light emitting element to project light onto said card held by said holding means and for collecting light reflected from said card, a light receiving element for receiving light collected by said objective and outputting a signal representing the received light, a tracking actuator for moving said objective in a tracking direction orthogonal to the information recording tracks of the information recording section, and a focusing actuator for moving said objective in a focusing direction orthogonal to said card surface;

means for generating a tracking error signal and a focusing error signal based on said output signal of said light receiving element;

first driving means for driving said tracking actuator;

tracking servo control loop means, including first switching means for connecting and disconnecting said tracking servo control loop means to said first driving means, for controlling said tracking actuator through said first driving means such that projected light through said objective traces the information recording track of the information recording section based on said tracking error signal when said first switching means connects said tracking servo control loop means;

second driving means for driving said focusing actuator;

focusing servo control loop means, including second switching means for connecting and disconnecting said focusing servo control loop means to said second driving means, for controlling said focusing actuator through said second driving means such that projected light through said objective is properly focused on the card surface based on said focusing error signal when said second switching means connects said focusing servo control loop means to said second driving means;

first forcible signal generator means for generating a first forced movement signal, and for applying said first forced movement signal to said first driving means, such that said objective is forcibly moved by said tracking actuator in a direction orthogonal to the information recording tracks of the information recording section;

first control means for causing said first switching means to disconnect said tracking servo control loop means, for causing said second switching means to connect said focusing servo control loop means, and for actuating said first forcible signal generator means to generate said first forced movement signal; and first card orientation judging means for determining whether the optical card is inserted into and disposed in said apparatus in a proper orientation based on analysis of said tracking error signal when said tracking servo control loop means is disconnected and said first forced movement signal is applied to said first driving means.

2. An optical card processing apparatus in accordance with claim 1, wherein said first card orientation judging means comprises:

means for binarizing said tracking error signal generated by said error signal generating means to form a pulse signal;

counting means for counting a number of pulses of said pulse signal for a predetermined time period; and means for determining whether the optical card is inserted into and disposed in said apparatus in proper orientation based on the number of pulses counted by said counting means.

3. An optical card processing apparatus in accordance with claim 1, further comprising:

second forcible signal generator means for generating a second forced movement signal, and for applying said second forced movement signal to said second driving means, such that said objective is forcibly moved by said focusing actuator in a direction orthogonal to the card surface;

second control means for causing said second switching means to disconnect said focusing servo control loop means, and for actuating said second forcible signal generator means to generate said second forced movement signal; and second card orientation judging means for determining whether the optical card is inserted into and disposed in said apparatus in a proper orientation by determining if said focusing error signal exceeds a predetermined level when said focusing servo control loop means is disconnected and said second forced movement signal is applied to said second driving means to cause said focusing actuator to move said objective in a direction orthogonal to the card surface.

4. An optical card processing apparatus in accordance with claim 3, further comprising:

absent card judging means for determining whether the level of said second forced movement signal reaches a predetermined limit level without a focusing error signal being generated by said error signal generating means, when said focusing servo control loop means is disconnected and said second forced movement signal is applied to said second driving means to cause said focusing actuator to move said objective in a direction orthogonal to the card surface.

5. An apparatus for determining whether an optical card is disposed in a proper reading/writing orientation in an optical card processing apparatus, said optical card processing apparatus including means for holding an optical card when is provided with an information recording section on a surface thereof, said information recording section being provided with information recording tracks; an optical system, having a light generating element, an objective and a light receiving element, for projecting light from said light generating element through said objective onto a card held by said holding means and receiving light reflected from the card through said objective; error signal generating means for generating a tracking error signal and a focusing error signal based on an output signal of said light receiving element; tracking control means having tracking actuator means for moving said objective in a tracking direction and tracking servo means for controlling said tracking actuator means for tracking in response to said tracking error signal; and focusing control means having focusing actuator means for moving said objective in a focusing direction and focusing servo means for controlling said focusing actuator means for focusing in response to said focusing error signal; said apparatus comprising:

first forcible signal generator means for generating a first forced movement signal to cause said tracking actuator means to move said objective in a direction orthogonal to the information recording tracks of the information recording section;

first disabling means for disabling said tracking servo means;

first control means for causing said first disabling means to disable said tracking servo means and for enabling said first forcible signal generator means to generate said first forced movement signal; and first card orientation judging means for determining whether the optical card is inserted into and disposed in said optical card processing apparatus in a proper orientation based on analysis of the tracking error signal when said tracking servo means is disabled and said objective is forcibly moved by said first forced movement signal.

6. An apparatus in accordance with claim 5, wherein said first card orientation judging means comprises:

means for binarizing said tracking error signal to form a pulse signal;

counting means for counting a number of pulses of said pulse signal for a predetermined time period; and means for determining whether the optical card is inserted into and disposed in said optical card processing apparatus in a proper orientation based on the number of pulses produced by said counting means.

7. An apparatus in accordance with claim 5, further comprising:

second forcible signal generator means for generating a second forced movement signal to cause said focusing actuator means to move said objective in a direction orthogonal to the card surface;

second disabling means for disabling said focusing servo means;

second control means for causing said second disabling means to disable said focusing servo means, and for enabling said second forcible signal generator means to generate said second forced movement signal; and second card orientation judging means for determining whether the optical card is inserted into and disposed in said apparatus in a proper orientation by determining if said focusing error signal exceeds a predetermined level when said focusing servo means is disabled and said objective is forcibly moved by said second forced movement signal.

8. An apparatus in accordance with claim 7, further comprising:

absent card judging means for determining whether the level of said second forced movement signal reaches a predetermined limit level without a focusing error signal being generated by said error signal generating means, when said focusing servo means is disabled and said objective is forcibly moved by said second forced movement signal.

9. A method for determining whether an optical card is disposed in a proper reading/writing orientation in an optical card processing apparatus, said optical card processing apparatus including means for holding an optical card which is provided with an information recording section on a surface thereof, said information recording section being provided with information recording tracks; an optical system, having a light generating element, an objective and a light receiving element, for projecting light from said light generating element through said objective onto a card held by said holding means and receiving light reflected from the card through said objective; error signal generating means for generating a tracking error signal and a focusing error signal based on an output signal of said light receiving element; tracking control means having tracking actuator means for moving said objective in a tracking direction and tracking servo means for controlling said tracking actuator means for tracking in response to said tracking error signal; and focusing control means having focusing actuator means for moving said objective in a focusing direction and focusing servo means for controlling said focusing actuator means for focusing in response to said focusing error signal; said method comprising the steps of:

enabling said focusing control means;

disabling said tracking servo means in said tracking control means;

generating a first forced movement signal and applying said first forced movement signal to said tracking actuator means of said tracking control means to forcibly move said objective in a direction orthogonal to the information tracks of the information recording section; and judging whether the optical card is inserted into and disposed in said apparatus in a proper orientation based on analysis of said tracking error signal.

10. A method in accordance with claim 9, wherein said judging step comprising the steps of:

converting said tracking error signal to a pulse signal by binarizing said tracking error signal;

counting a number of pulses of said pulse signal for a predetermined time period; and determining whether the optical card is inserted into and disposed in said apparatus in a proper orientation based on the counted number of pulses.

11. A method in accordance with claim 9 further comprising the steps of:

disabling said focusing servo means of said focusing control means;

generating a second forced movement signal and applying said second forced movement signal to said focusing actuator means of said focusing control means to forcibly move said objective in a direction orthogonal to the card surface;

determining whether said focusing error signal exceeds a predetermined level; and proceeding to said focus control means enabling step when said focusing error signal exceeds said predetermined level.

12. A method in accordance with claim 11 further comprising the steps of:

determining whether said focusing error signal is generated from said error signal generating means;

proceeding to said focusing error signal limit determining step if said focusing signal is generated;

determining whether the level of said second forced movement signal reaches a predetermined limit level without said focusing error signal being generated; and judging that the optical card is absent if the level of the second forced movement signal reaches said predetermined limit level.

* * * * *